United States Patent

[11] 3,584,781

[72] Inventor James O. Edson
Mansfield Township, Warren County, N.J.
[21] Appl. No. 741,432
[22] Filed July 1, 1968
[45] Patented June 15, 1971
[73] Assignee Bell Telephone Laboratories, Incorporated
Murray Hill, Berkeley Heights, N.J.

[54] FFT METHOD AND APPARATUS FOR REAL VALUED INPUTS
9 Claims, 6 Drawing Figs.

[52] U.S. Cl. .......... 235/156, 340/172.5
[51] Int. Cl. .......... G06f 7/38
[50] Field of Search .......... 235/152, 156; 340/172.5

[56] References Cited

OTHER REFERENCES

Harry Andrews " A High-Speed Algorithm for the Computer Generation of Fourier Transforms," IEEE Trans. on Comp. April, 1968, pp. 373—375
Cooley, " An Algorithm for the Machine Calculation of Complex Fourier Series," Math. of Comp. , Vol. 19, April, 1965, pp. 297—301

*Primary Examiner*—Malcolm A. Morrison
*Assistant Examiner*—David H. Malzahn
*Attorneys*—R. J. Guenther and William L. Keefauver ABSTRACT: Methods and apparatus for generating Fourier series coefficients by fast Fourier transform techniques are disclosed. When the input sequence to be transformed includes only real-valued signals, important savings of storage and computation time are realized through the elimination of conjugate results. Instead, only one of a pair of conjugate final results, and the intermediate results leading to them, are explicitly generated; the remaining results are derived by selective conjugation. Techniques for facilitating the computing methods by selective reordering and accessing are also described.

FIG. 1

| K | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| k 4 | 0 | | | | | | | | | | | | | | | | 1 | | | | | | | | | | | | | | | |
| k 3 | 0 | | | | | | | | 1 | | | | | | | | 0 | | | | | | | | 1 | | | | | | | |
| k 2 | 0 | | | | 1 | | | | 0 | | | | 1 | | | | 0 | | | | 1 | | | | 0 | | | | 1 | | | |
| k 1 | 0 | | 1 | | 0 | | 1 | | 0 | | 1 | | 0 | | 1 | | 0 | | 1 | | 0 | | 1 | | 0 | | 1 | | 0 | | 1 | |
| k 0 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| A(k) | A(0) | A(1) | INPUT DATA | | | | | | | | | | | | | | | | | | | | | | | | | | | | | |
| A 1 | ADD TERM BY TERM SECOND HALF AND FIRST 0° | | | | | | | | | | | | | | | | SUBTRACT TERM BY TERM 180° SECOND HALF FROM FIRST | | | | | | | | | | | | | | | |
| A 2 | 0° | | | | | | | | 180° | | | | | | | | 90° | | | | | | | | 270° | | | | | | | |
| A 3 | 0° | | | | 180° | | | | 90° | | | | 270° | | | | 45° | | | | 225° | | | | 135° | | | | 315° | | | |
| A 4 | 0 | | 180 | | 90 | | 270 | | 45 | | 225 | | 135 | | 315 | | 22.5 | | 202.5 | | 112.5 | | 292.5 | | 67.5 | | 247.5 | | 157.5 | | 337.5 | |
| A 5 | 0 | 180 | 90 | 270 | 45 225 | | 135 315 | | 22.5 202.5 | | 112.5 292.5 | | 67.5 247.5 | | 157.5 337.5 | | 11.25 191.25 | | 101.25 281.25 | | 56.25 236.25 | | 146.25 326.25 | | 33.75 213.75 | | 123.75 303.75 | | 78.75 285.75 | | 168.75 348.75 | |
| J | 0 | 16 | 8 | 24 | 4 | 20 | 12 | 28 | 2 | 18 | 10 | 26 | 6 | 22 | 14 | 30 | 1 | 17 | 9 | 25 | 5 | 21 | 13 | 29 | 3 | 19 | 11 | 27 | 7 | 23 | 15 | 31 |
| 32-J | | | | 8 | | 12 | | 4 | | 14 | | 6 | | 10 | | 2 | | 15 | | 7 | | 11 | | 3 | | 13 | | 5 | | 9 | | 1 |

INVENTOR
J. O. EDSON
BY K. O. Nirz[signature]
ATTORNEY

FIG. 4

| | | | | | | | | | | | | | | | | | |
|---|---|---|---|---|---|---|---|---|---|---|---|---|---|---|---|---|---|
| 1 | REGISTER NUMBER | 000 | | 001 | | 010 | | 011 | | 100 | | 101 | | 110 | | 111 | |
| 2 | LEFT OR RIGHT | L | R | L | R | L | R | L | R | L | R | L | R | L | R | L | R |
| 3 | SAMPLE IDENTITY (BINARY) | 0000 | 0001 | 0010 | 0011 | 0100 | 0110 | 0101 | 0111 | 1000 | 1100 | 1001 | 1101 | 1010 | 1110 | 1011 | 1111 |
| 4 | SAMPLE IDENTITY (DECIMAL) | 0 | 1 | 2 | 3 | 4 | 6 | 5 | 7 | 8 | 12 | 9 | 13 | 10 | 14 | 11 | 15 |
| 5 | FIRST ITERATION OPERANDS & RESULTS | 0+8 | 1+9 | 2+10 | 3+11 | 4+12 | 6+14 | 5+13 | 7+15 | 0-8 | 4-12 | 1-9 | 5-13 | 2-10 | 6-14 | 3-11 | 7-15 |
| 6 | SECOND ITERATION OPERANDS | 0,4 | 1,6 | 2,5 | 3,7 | 0,4 | 1,6 | 2,5 | 3,7 | 8 | 12 $W^{-1}$ | 9 | 13 $W^{-1}$ | 10 | 14 $W^{-1}$ | 11 | 15 $W^{-1}$ |
| 7 | SECOND ITERATION RESULTS | 0+4 | 1+6 | 2+5 | 3+7 | 0-4 | 1-6 | 2-5 | 3-7 | 8+12 $W^{-1}$ | | 9+13 $W^{-1}$ | | 10+14 $W^{-1}$ | | 11+15 $W^{-1}$ | |
| 8 | THIRD ITERATION OPERANDS | 0,2 | 1,3 | 0,2 | 1,3 | 4 | 6, $W^{-1}$ | 5 | 7, $W^{-1}$ | (100), (110), W-2 | | (101), (111), W-2 | | (100), (110), W-2 | | (101), (111), W-2 | |
| 9 | THIRD ITERATION RESULTS | 0+2 | 1+3 | 0-2 | 1-3 | 4+6 $W^{-1}$ | | 5+7 $W^{-1}$ | | (100)+(110) $W^{-2}$ | | (101)+(111) $W^{-2}$ | | (100)-(110) $W^{-2}$ | | (101)-(111) $W^{-2}$ | |
| 10 | FOURTH ITERATION RESULTS | 0+1 | 0-1 | 2+3 $W^{-1}$ | | (010)+(011) $W^{-2}$ | | (010)-(011) $W^{-2}$ | | (100)+(101) $W^{-3}$ | | (100)-(101) $W^{-3}$ | | (110)+(111) $W^{-3}$ | | (110)-(111) $W^{-3}$ | |
| 11 | HARMONIC COEFFICIENTS | X(0) | X(8) | X(4) | | X(2) | | X(10) | | X(1) | | X(9) | | X(5) | | X(13) | |

FFT METHOD AND APPARATUS FOR REAL VALUED INPUTS

This invention relates to methods and apparatus for signal processing. More particularly, this invention relates to methods and apparatus for the frequency analysis and synthesis of data signals. Still more particularly, this invention relates to methods and apparatus for performing fast Fourier transforms for real-valued input data signals.

BACKGROUND OF THE INVENTION

Machine methods for frequency analysis and synthesis of signals using Fourier series and integral techniques have long been important areas of scientific and engineering investigation. In recent years there have been developed improved means and methods for performing such analyses and syntheses. Among these improved techniques are included those known collectively as fast Fourier transform (FFT) techniques. These FFT techniques originated in recent history with a paper entitled "An Algorithm for the Machine Calculation of Complex Fourier Series," by J. W. Cooley and J. W. Tukey, *Mathematics of Computation*, Vol. 19, Apr. 1965, pp. 297—301. The computational advantages demonstrated by this paper have spurred research in areas previously felt to be beyond economic feasibility. These advantages, often involving computational savings of time and machine complexity of an order of magnitude or more compared with classical techniques, flow largely from judicious groupings and reorganizations of summation techniques known in the prior art.

Numerous improvements and variations of the original FFT techniques have been developed since the publication of the original Cooley-Tukey paper, several of which were summarized in the June 1967 issue of the *IEEE Transactions on Audio and Electroacoustics*, Vol. AU–15. Other important developments have been disclosed, for example in U.S. Patent applications by M. J. Gilmartin et al., Ser. No. 605,768, filed Dec. 29, 1966 now U.S. Pat. No. 3,517,173, issued June 23, 1970 and G. D. Bergland et al., Ser. No. 605,791 filed Dec. 29, 1966 now U.S. Pat. No. 3,544,755, issued Dec. 1, 1970. Another reference that should prove helpful in understanding the present invention in light of the prior art is one by R. Klahn and R. R. Shively, "FFT—Shortcut to Fourier Analysis," *Electronics*, Vol. 41, No. 8, Apr. 15, 1968, pp. 124—129.

The previously described developments have all contemplated as input signals a sequence of complex-valued signals to be transformed into a series of complex-valued signals. That is, each value element of the input sequence is represented by a two-part signal, one part corresponding to the real part of the input element value and the other part corresponding to the imaginary part of the same complex value. Transformations performed on input signals not of this complex form would be processed in the prior art in exactly the same manner as if the input signals had been complex; no special advantage was shown to follow when the input signals were strictly real-valued signals. Some efforts were made which involved treating two real-valued input sequences as a single complex sequence, but these efforts often gave rise to nonindependent results.

SUMMARY OF THE INVENTION

The present invention provides improvements to the heretofore known FFT methods and the apparatus for performing these methods, which improvements are especially adapted to efficiently perform Fourier transforms for real-valued input signals. The techniques of the present invention are more efficient in that they eliminate certain redundant computations required in the previously-used methods. Thus, an economy of computational apparatus and apparatus for storing final and intermediate results are realized. In addition, because certain intermediate calculations previously thought to be essential can be eliminated using the present invention, there evolves an important saving in the time required to perform a transformation.

Briefly stated, the present invention in typical embodiment first requires that a real-valued input signal sequence be stored in a memory. Often it is found convenient to reorder the storage sequence in accordance with an algorithm given below. These signals are then iteratively and selectively combined with each other and with selected exponential-valued signals in accordance with detailed methods given below. At each iteration except the last, results are generated which are used as operands for the succeeding iteration; the operands for the first iteration are the results of the zeroth iteration, i.e., the input signals. The results of the last iteration are the desired complex Fourier coefficients corresponding to the input sequence.

BRIEF DESCRIPTION OF THE DRAWINGS

These features and others will be more completely understood with reference to the following detailed description and the attached figures wherein:

FIG. 1 is a chart useful in understanding prior art FFT techniques and identifying certain redundancies inherent therein;

FIG. 4 is a chart illustrating the sequence of machine operations in accordance with one embodiment of the present invention;

NOTATION AND NOMENCLATURE

Figure 2:
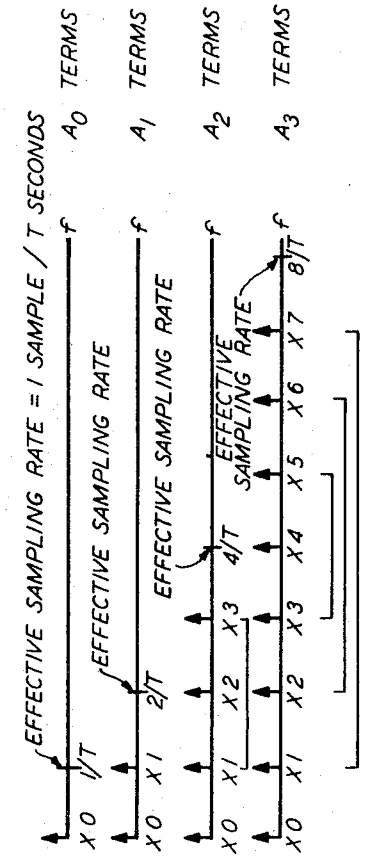
FIG. 2 is a sequence of graphs showing the number of coefficients generated in successive prior art FFT iterations and indicating conjugate relationships existing in these coefficients.

The detailed descriptions to follow are presented largely in terms of algorithms. These algorithmic descriptions are the means used by those skilled in the data processing art to most effectively convey the substance and meaning of their work to others skilled in the data processing arts.

An algorithm is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as samples, values, elements, terms, real-valued quantities, complex-valued quantities, number, or the like. It should be borne in mind, however, that all of these and similar terms are to be associated with the appropriate physical quantities and are merely convenient labels applied to these quantities.

Further, the manipulations performed are often referred to in terms, such as "adding," which are commonly associated with mental operations performed by a human being. This is not the sense in which terms such as "adding" are used here. No human operator is necessary (or desirable in most cases) in any of the operations described herein; the operations are machine operations.

Useful machines for performing the operations of the present invention include general purpose computers of the IBM 7090/94 class, various of the IBM System 360 class, the GE–600 class, or other similar machines. In all cases there should be borne in mind the distinction between the method operations in operating a computer and the method of computation itself. The present invention relates to method steps for operating a computer in processing electrical or other (e.g., mechanical, chemical) physical signals to generate other desired physical signals. The present invention also relates to apparatus for performing these operation.

The algorithms presented herein are not inherently related to any particular computer or other apparatus. In particular, various general purpose machines including those mentioned above, may be used, or it may prove more convenient to construct more specialized apparatus to perform the required method steps. The required structure for various of these machines will appear from the description given below.

REVIEW OF PRIOR ART TECHNIQUES

This section includes a description of prior art techniques which are helpful in understanding various aspects of the present invention. Certain of the matters discussed represent material which becomes clear only in light of the present invention.

Given a set of $N=2^m$ input signals $A_0(k)$ representing samples of a time-function taken at equally spaced intervals, starting with $A_0(0)$ at the arbitrarily chosen time origin, it is often desired to find a set of complex coefficients $X(j)$ capable of representing the samples as a Fourier series. In appropriate cases the $A_0(k)$ may represent samples of a spatial function or other nontime function. If the $A_0(k$are complex and all independent, the $X(j)$ are complex and independent as well. The indices $j$ and $k$ will range from O to N−1 and can be expressed in binary form by $$k=k_{m-1}\cdot 2^{m-1}+k_{m-2}\cdot 2^{m-2}+\ldots+k_1\cdot 2+k_0$$

and $$j=j_{m-1}\cdot 2^{m-1}+j_{m-2}\cdot 2^{m-2}+\ldots+j_1\cdot 2+j_0$$

where each of the $k_i$ and $j_i$ may have values O or 1 for $i,j=0, 1, 2,\ldots,m-1$.

Previously known techniques teach that the calculation of the $X(j)$ can be reduced to the iterative calculation of sequences of increasingly comprehensive Fourier series terms $A_p(k$ *where* $p$ assumes values from 1 to $m$. The final results are obtained by the identification of the $A_m(k)$ with corresponding ones of $X(j)$. In particular, it is found that for many machine organizations the identification proceeds in accordance with the relation $X(j_{m11}j_{m12},\ldots j_1, j_0) = A_m(j_0,\ldots j_{m11})$, or simply that in the process of calculating the $A_m$ (i. e., iterating from $A_0(k)$ to $A_m(k)$) the binary representation of the indices have become reversed in sequence, so that the $X(j)$ do not immediately appear in ascending order.

The recursive formula for the $A_p$ is given by $$A_1(j_0, k_{m-2}, \ldots, k_0)=\sum_{k_{m-1}=0}^{1} A_0(k_{m-1}, \ldots, k_0)W^{j_0 k_{m-1} 2^{m-1}}$$

for the first iteration and for $A_p$, in general, by $$A_p(j_0, \ldots, j_{(p-1)}, k_{(m-p-1)}, \ldots, k_0)$$

$$=\sum_{k_{m-p}=0}^{1} A_{p-1}(j_0, \ldots, j_{p-2}, k_{m-p}, \ldots, k_0) \cdot W^{(j_{p-1}2^{p-1}+\ldots+j_0)k_{m-p}2^{m-p}}$$

where $$W=e^{\frac{2\pi i}{2^m}}.$$

An interpretation and further discussion of the above-outlined prior art techniques is provided in a paper by R. R. Shively "A Digital Processor to Perform a Fast Fourier Transform," *First Annual IEEE Computer Conference Proceedings*, 1967, pp. 21—24. Other papers found to be useful in understanding these techniques include "Applications of the Fast Fourier Transform Method," by J. W. Cooley, *Proceedings of the IBM Scientific Computing Symposium*, Yorktown Heights, New York, 1966 and "What is the Fast Fourier Transform?" *IEEE Transactions on Audio and Electroacoustics*, Vol. AU-15, June 1967, pp. 45—55.

These and other papers describe the sequence of $A_i$ values at each iteration as being sets of unnormalized Fourier coefficients formed from interleaved sets of samples. The original input samples, the $A_0$ values, can be thought of as $N$ distinct one-term Fourier series representations of the DC value of the input time function. Thus, the $N$-term sequence of $A_0$'s may be interpreted as $N$ separate coefficients $X(0)$.

The $A_1$ values are estimates of the DC term and the first harmonic, i.e., the $X(0)$ and $X(0)$ Fourier coefficients, as evaluated from N/2 separate two-term Fourier series. The terms in the first half of the $A_1$'s represent $X(0)$ coefficients, and the second-half terms represent X(1) coefficients.

In like manner, the $A_2$'s represent $X(O)$, $X(1)$, $X(2)$ and $X(3)$ Fourier coefficients as evaluated from $N4$ separate four-term Fourier series, and the $A_3$'s represent the Fourier coefficients evaluated from $N8$ separate eight-term Fourier series.

In each case, a stage in the recursive algorithm represents combining unnormalized Fourier coefficients formed from two interleaved sets of samples to form twice as many Fourier coefficients (because the effective sampling rate is doubled) from the combined set.

The chart, shown in FIG. 1 is useful in illustrating this computational process. Across the top of FIG. 1 are listed the index numbers $k$ ranging from 0 to 31 for the case $N=2^m32$. In the next five lines are listed the corresponding binary digit values $k_4$, $k_3$, $k_2$, $k_1$, and $k_0$. If the corresponding $j$ index numbers were to be indicated, they would appear in reverse order. That is, $j_0$ would appear on the same line as $k_4$, $j_1$ on the same line as $k_3$, and so forth. Next are listed the input data $A_0(k)$ which are typically entered sequentially into a set of registers. When the input samples are complex, two words are typically required for each sample.

The first iteration requires the exhaustive pairing of elements from the given input data, one from the first half (left half in FIG. 1) and one from the second half. These elements are, in turn, added and the sum entered in the position vacated by the selection of the first half elements. In addition, the value of the second half element is subtracted from that of the first half element and the difference stored in the vacated position in the second half.

The reference to 0° in the left-hand portion indicates that the exponential element (phasor) involved in a degenerate (O°) one having the value +1. Similarly, the reference to 180° indicates a phasor having value +1. In subsequent iterations the phasor angle is appropriately indicated. All combining operations (additions and subtractions) may be considered to be additions if the proper phasor values, including sign, are used.

When this pair selection and combination is complete, the resulting information in the form of sequence $A_1$ is considered to be separate into two equal sized groups of elements and no further interaction takes place between these groups. The first half group represents even order harmonics and the second half group represents odd order terms in the intermediate Fourier series.

The second iteration (for generating the sequence $A_2$) involves selection as before only with respect to the even order (first half) set; the second half set is treated differently, as will be seen below. The operations of the first iteration are repeated, i.e., this first half set of $A_1$ is divided into two groups and respective elements form each of these two groups are added, subtracted, and the results stored in the locations previously occupied by the operands.

With respect to the second half of $A_1$, the elements are split in two groups as before, but the right half signals in the second half of $A_1$ (i.e., the right most quarter of $A_1$ in FIG. 1) are multiplied by a 90° phasor before being added and subtracted to the corresponding left half (third quarter of $A_1$) values. Even if the given data are complex, this multiplication represents no more than an interchange of real and imaginary values, with proper account of signs, and adding or subtracting. With pure real inputs, it results only in writing the second set of values in the imaginary resistors with proper account of sign. These latter observations are not found in prior art discussions.

The third iteration (for generating $A_3$) becomes more complicated; there are now four separate groups of $A_2$ to deal with. The first and second are treated just as the two were treated in the second iteration. The third group is divided in two as usual and its second half terms are multiplied by a 45° phasor then added and subtracted to the first half terms. The fourth group uses a 135° phasor.

In the fourth iteration the first four groups are treated as in the third iteration, but for each of the remaining four groups the phasor angles are increased by 22.5° over those used in the first four groups.

By this time the pattern is evident. The first half of the groups in an iteration are treated as were the entire predecessor set in the previous iteration. The second half signals receive similar treatment except for the addition of $360/2^p$ degrees of phase shift. In the present case ($N$=32) the desired final results are obtained after five iterations.

Figure 3:
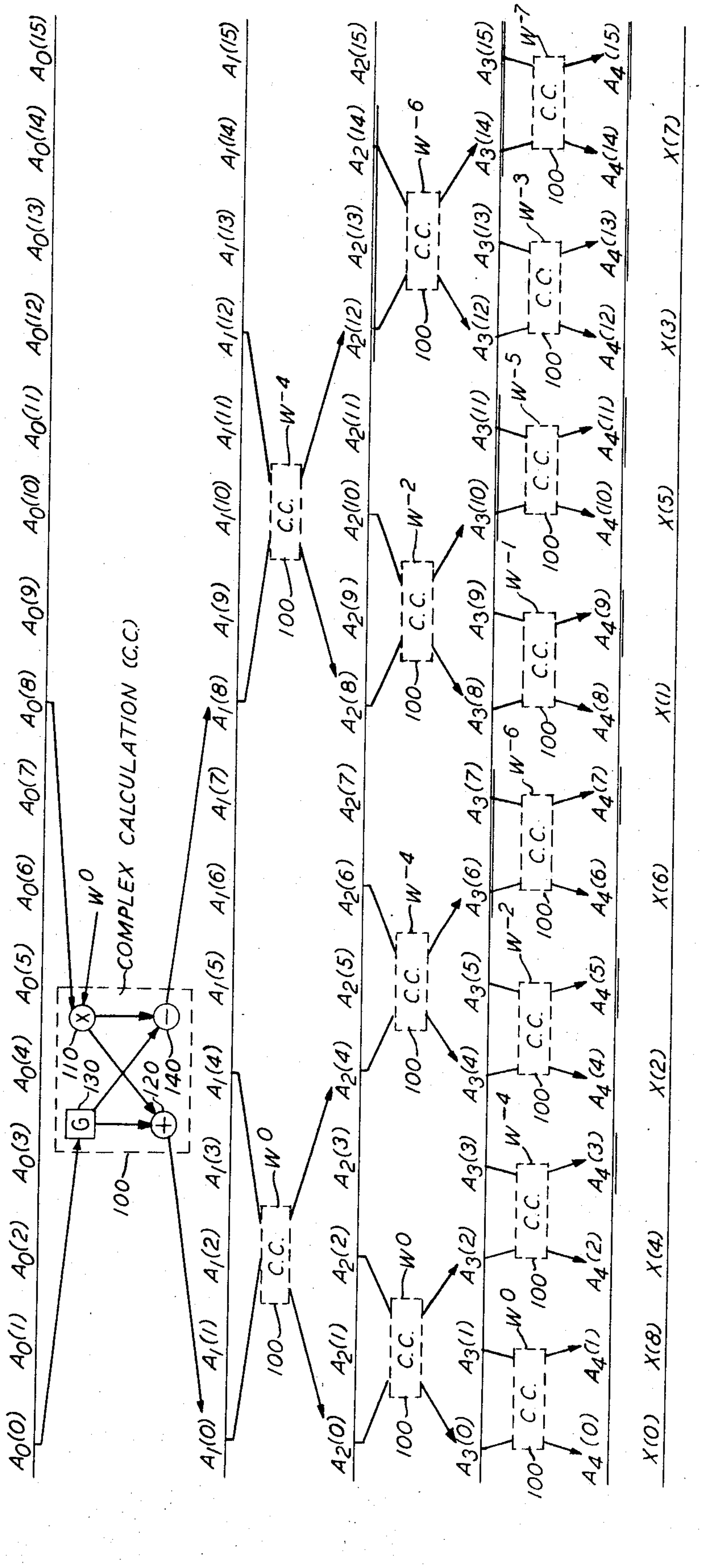
FIG. 3 is a flow chart illustrating the prior art Cooley-Tukey FFT algorithm.

The Cooley-Tukey algorithm for complex time series is shown diagrammatically in FIG. 3 for the example of $N$=16. The basic set of operations is represented by the block 100 further identified as performing a "Complex Calculation" which has for its operands the paired complex value input signals. Block 100 denotes that (1) the second complex input is multiplied in block 110 by the appropriate power of $W$, where $W=\exp(2\pi i/N)$, (2) the resulting product is added in block 120 to the first complex input to form the first output term, and (3) this product is subtracted in block 140 from the first input term to form the second output term. Block 130, further identified as "G," indicates only a temporary storage of the first input signal and does not denote an arithmetic operation.

Although this identical set of "complex calculations" is actually performed $N/2$ times during each iteration, FIG. 3 only shows the accessing and storage patterns for the first set in each group. Each pattern shown is applied sequentially to all of the operands in its group. In the first iteration, for example, the set of "complex calculations" is shown applied to the $A_0$ (0) and $A_0(8)$ terms. It is next applied to the $A_0(1)$ and $A_0$terms, the $A_0(2)$ and $A_0(10)$ terms, and so on. By showing only the first operation of each sequence, the diagram can be kept quite simple while still denoting all of the necessary information. A further useful discussion which will help in understanding the prior art processes will be found in a copending U.S. patent application by G. D. Bergland filed of even date with the present application.

BASIS FOR THE REVISED ALGORITHM FOR REAL-VALUED INPUTS

As outlined above, the prior art process typically requires 2N registers, each capable of storing one component of a complex number. This number of registers is just sufficient to store the $N-1$ complex and two real signals representing $X(a\ j)$; $X(N/2$aturn out to be real numbers if the input samples are real. However, it is important to note in connection with the present invention that if the inputs are real, then $$X(N-j)=X^*(j),$$

where * indicates complex conjugation. Thus, when the input values are real the prior art process has produced outputs in conjugate pairs, except for $X(O)$ and $X(N/2)$ which are real. This redundancy was not clearly recognized in the prior art and no satisfactory method of eliminating it was present in the prior art. Only those values of $j$ less than $N/2$ are required to be computed explicitly. The sufficiency of this reduced computation was likewise not recognized in the prior art. The line under $A_5$ to the chart in FIG. 1 lists the decimal values of index $j$ and the next line lists ($32-j$), for $j$ over 16.

It can be seen from these last two lines of FIG. 1 that all of the desired odd-harmonic coefficients or their complex conjugates are given by either the third or fourth quarter of the results, and one or the other can be deleted. Furthermore, these calculations are entirely separate after the first iteration, so the duplicate calculations can be omitted.

The second iteration involves multiplying the last quarter of the entries by a 90° phasor and adding to the third quarter. With real input entries, this produces complex signals for the first time. Since only $N/2$ complex signals are needed, the registers which held the last quarter of the real signals generated by the first iteration can be used to hold the imaginary parts of the operands, which imaginary parts are already stored in the appropriate locations when the second iteration begins. Thus, in effect, the second iteration becomes superfluous for the odd group.

By virtue of the leftward motion of the operating phasors in successive iterations, the same is true for odd multiples of two in the third iteration and for odd multiples of $2^{p-2}$ in the p'th iteration. The redundant computations are indicated by stippling in FIG. 1.

The above discussion of the redundancy inherent in the prior art FFT techniques is summarized in FIGS. 2 for the case $N=2^m=8$. There, a set of graphs are presented which show the $A_0$ 's, $A_1$'s, etc., as Fourier coefficients displayed as a function of frequency. Note that the set of $A_0$ and $A_1$ values are both composed of only real signals. However, the set of $A_2$ values consists of $N/2$ real numbers (the $X(0)$ and $X(2)$ terms), $N/4$ complex $X(1)$ terms, and $N/4$ complex $X(3)$ terms. From FIG. 2 it is apparent that the third harmonic terms are above one-half the effective sampling frequency, and since they were formed from real-valued samples, the set of $X(3)$ terms and the set of $X(1)$ terms are complex conjugates. This conjugate relationship is indicated by the brackets in FIG. 2. Thus, only the $N/4$ values of the first harmonic are truly independent. This means that to store the independent $A_2$ signals we only need storage for $N/2$ real signals and $N/4$ complex signals, i.e., $N$ storage locations when each complex component is stored in a separate location.

Analogously, the $A_3$ values representing the fifth, sixth, and seventh harmonics are complex conjugates of the third, second, and first harmonics, respectively. Since the $X(0)$ and $X(4)$ terms are real and only the $X(1)$, $X(2)$, and $X(3)$ complex terms must be saved, we still require only $N$ storage locations. Again the conjugate pairs are indicated by brackets.

This process continues until at the last stage the $N/2-1$ independent complex Fourier coefficients and the two independent real Fourier coefficients are formed by combining all $N$ of the original real samples. Thus, it is apparent that for a real-valued time series of $N$ samples, we have only $N$ independent signals at the beginning, and $N$ independent signals at the end (i.e., $N/2-1$ complex signals and two real signals); no additional storage is required in the intervening steps. Since the discarded intermediate results at any stage can be formed by simply conjugating the appropriate saved value, this process proves to be quite convenient to implement.

DESCRIPTION OF THE REVISED REAL-VALUE-INPUT FAST FOURIER TRANSFORM ALGORITHM

The following description relates to one method in accordance with the present invention for performing an FFT for real-valued input signals, which method realizes the efficiencies described above. Several options will also be described.

Figure 5:
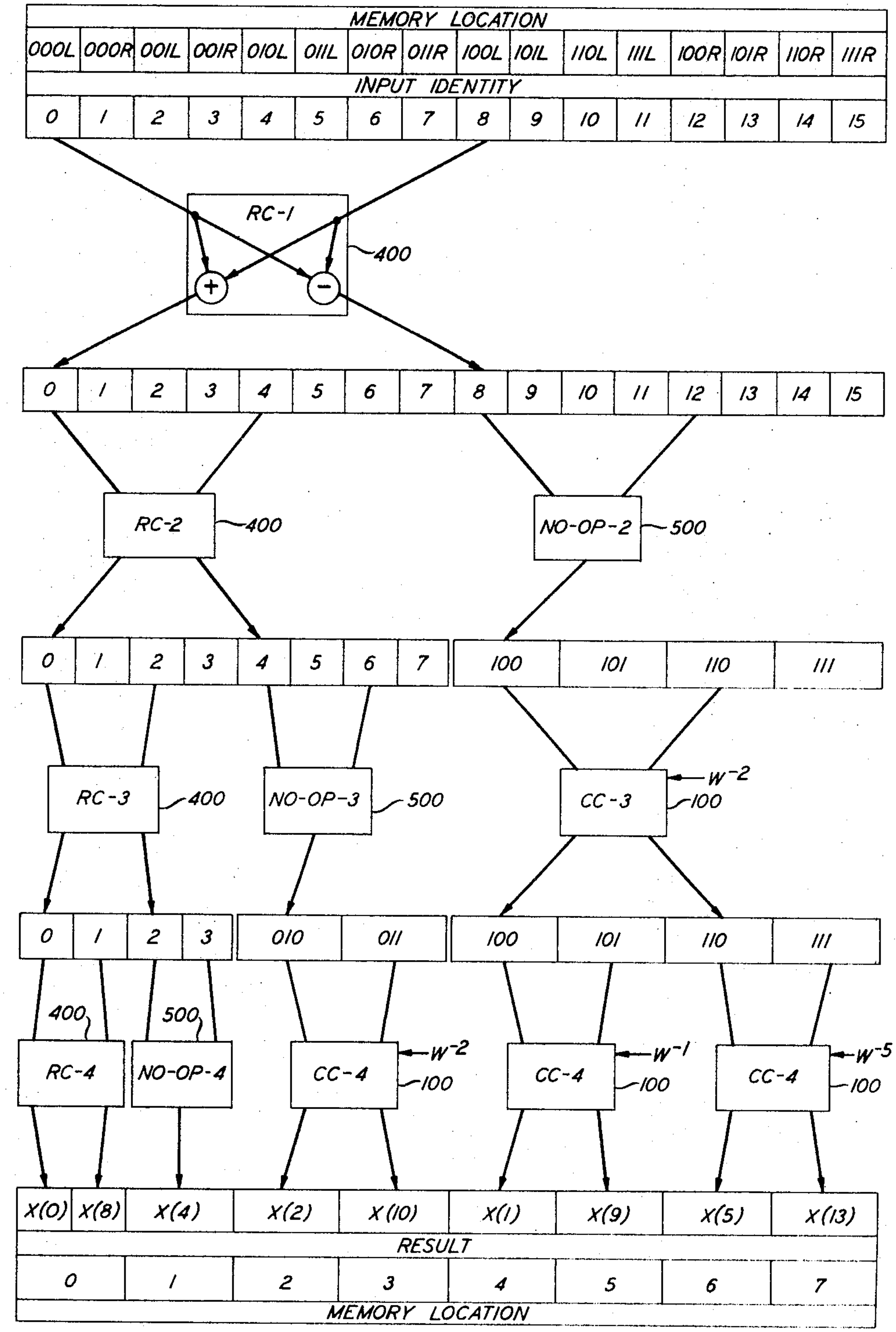
FIG. 5 is a flow chart illustrating in alternate manner the substance of FIG. 4.

As can be seen from FIGS. 1 and 3, each iteration in the Cooley-Tukey version of the transform requires at least some degenerate computations which involve only real value operands, and which produce only real-valued results. The techniques of adding, subtracting and multiplying are, of course, the same in these degenerate cases; only the noncomplex nature of the operands distinguish these operations. By analogy with the reference in FIG. 3 to a complex calculation, this type of degenerate operation will be referred to as a real calculation. In FIG. 5, which illustrates graphically the method to be described, a block identified as 400 is used to represent such real calculations. It should be noted, of course, that multiplication by $W^0=1$ corresponds to no operation.

It proves convenient in some embodiments of the present invention to reorder the input samples before they are presented for combination and substitution in accordance with well-known FFT techniques. That is, if the input samples are generated in time sequence and are labeled at they are generated with sample identity signals assuming the integer values 0 through 15 (for a typical 16 record), it proves convenient to store the samples at other than consecutive memory locations.

In FIG. 5, along the line designated INPUT IDENTITY are shown the samples 0 through 15 as they occur in sequence. Above these designations are shown the respective storage locations in which it is convenient to store them. For the case of a 16-sample real-valued input sequence, it is found convenient to use eight registers labeled 0 through 8, each having a left and a right portion. These registers are therefore suitable for storing 16 real-valued signals or the real and imaginary parts of eight complex signals.

The assignment of memory locations to the data samples conveniently proceeds in accordance with an algorithm given below. The process is illustrated for the case $N=16$ in FIG. 4 on lines 1, 2 and 3, as well as in FIG. 5 as mentioned above.

As also mentioned above, the samples are conveniently identified by the integers 0 through 15 (or 0000 through 1111 in binary form). Since only 8 registers are to be used, the four-digit binary sample identification signals cannot be used to unambiguously specify the correct register for storing a sample. Thus, only three of the four digits are used to determine the appropriate memory locations; the fourth is used to identify the left and right portions of the register to be used. The occurrence of a "O" in this remaining digit position is conveniently used to designate the left half of a register and a "1" to designate the right half of a register.

While in some cases it is possible to choose the first three digits to designate the register location, a different technique is employed in an assignment algorithm in accordance with one embodiment of the present invention. In all cases, the "-first," "left-most" and "most significant" digits are to be considered the same, as are "last," "rightmost" and "least significant." This memory assignment algorithm then comprises the steps of:

1. Identifying the first "1" in each sample-identifying binary integer.
2. Loading the sample into the left half of location 000 if no 1's are found, i.e., if the sample is the zeroth one.
3. Loading the sample into the right-hand half of location 000 if the first 1 occurs in the last digit position.
4. Loading the sample into the location indicated by the binary integer formed by masking the binary digit following (to the right of) the first 1 in the original binary integer when steps 2 and 3 are not applicable. For example, the sample identified by 0110 is loaded into location 010 because the third digit is the one following the first 1, and hence is masked.
5. Loading the sample in the left- or right-hand part of the register indicated in step 4 according to whether the digit masked in step 4 is a 0 or 1, respectively.

With the samples stored in the order indicated by lines 1—4 in FIG. 4, a sequence of real-value calculations and complex calculations of the type heretofore mentioned are performed on the input data. This sequence will now be described for the $N=16$ case.

It proves convenient in one embodiment of the present invention to perform all real-value calculations first before proceeding to complex calculations. It should be noted that at the first iteration in a real-value input case all calculations are real-valued, even in the Cooley-Tukey method with real inputs. At the second iteration, half of the operations involve only real-value calculations and, in general, the ith iteration requires $2^{m1f11}$ real-value calculations; the remainder of the $2^{m11}$ operations involve complex calculations of the type heretofore mentioned.

It is often convenient to perform all calculations involving a given exponential function (regardless of the iteration in which it occurs) at the same time, or in adjacent time intervals. This choice is contrasted with the method of completely performing an entire iteration (thereby calling a given exponential function on widely separated occasions) as typically occurs in the Cooley-Tukey version of the FFT. This revised method of computation requires fewer memory access cycles for the exponential function values, or, where appropriate, fewer calculated exponential values. The technique of first performing all real value operations as described in the preceding paragraph is seen to be a special case of that described in this paragraph.

A typical process for computing FFT's in accordance with the present invention will now be illustrated for the case of $N=16$. Reference to FIGS. 4 and 5 will prove helpful throughout this discussion.

Line 5 in FIG. 4 indicates the actual operations performed during the first iteration. All operations are real; only a degenerate exponential $e^0=1$ is involved, and multiplication by this factor need only be performed implicitly. The notation "O+8" found at the left of line 5 indicates that operands (input samples) identified with sample identity integers 0 and 8 (found in the left-hand portions of registers 000 and 100, respectively) are added and the sum used to replace the previous contents of the left side of register 000.

For purposes of this discussion, the left-hand portion of register 000 will be indicated by the notation oooL. Likewise, 000R will indicate the right-hand portion of register 000; 100R will indicate the right-hand portion of register 100; etc.

It will be noted that the first half of the operations at iteration 1 (proceeding from left-to-right in FIG. 4) involve involve addition, and the second half of these operations involve subtraction. In either event, the result is used to replace the previous contents of the register associated with the column showing the particular operands. For example, the result of subtracting sample 12 from sample 4 is stored at 100R.

While more than one of the operations indicated in line 5 of FIG. 5 may be performed simultaneously if appropriate apparatus if available, it proves convenient in some embodiments of the present invention to perform these operations in some directed sequence. For this purpose a three-stage binary counter initially set at 000 may be advanced through all of its states, thereby providing a sequence of eight three-digit "-core" signals. These core signals are combined with a fourth digit assuming both of the values 0 and 1 to form the two required four-digit sample-identifying signals. For example, when the core signal is 010 at the first iteration, the digits 0 and 1 are appended as leading digits to form 0010 and 1010 (or 2 and 10), respectively. These are the paired signals needed to identify the operands used to form the result stored at 001L and 110L, respectively. Of course, the four-digit numbers are easily related to the correct memory locations by using the storage assignment algorithm given above. The appended digit signals are located at the second digit position for the second iteration, and so forth.

The entire first iteration can easily be directed by advancing the three-digit binary counter through its eight states in sequence and performing the indicated addition and subtraction operations after each state change. Because these two operations are not always performed simultaneously, temporary storage is conveniently provided for one of the operands, or for the first generated result. This permits both operands to remain available for both operations.

The results of iteration 1 are, of course, the operands for iteration 2. It proves convenient to continue to identify these results with the sample identity numbers 0—15 previously used. In all cases, then, these identity numbers are considered to identify a result; the input samples are considered the result of the zeroth iteration. The location in memory of a result associated with a particular identity number may be determined by using the input reordering algorithm given above.

At the second iteration, the leftmost eight operands (those in memory locations 000 through 011) are again separated into two groups. From each of these latter two groups are selected elements to be paired for purposes of addition and subtraction as in the first iteration. The last four of the remaining eight operands are, according to the well-known FFT principles, multiplied by a 90° phasor and selectively added and subtracted to the other four of these eight operands. These operations on the rightmost eight operands (results of the first-iteration) form complex numbers, requiring twice as much storage as would be required if the 90° phasor were not introduced. Thus, if an exhaustive pairing in the manner of iteration 1 were employed, eight registers capable of storing complex numbers would be required.

In light of the earlier discussion regarding redundancy, however, it is clear that half of these results are not needed. That is, instead of forming the sum and difference of the contents of a real and imaginary term, only one of these results need be formed.

The combining of the second half of the results of the first iteration (with the 90° or 270° phasor included) to form results of the second iteration is shown in FIG. 1 to involve the addition and subtraction of operands selected from the third quarter of memory locations with corresponding elements of the fourth quarter (the latter having been multiplied by the phasor). In the method in accordance with one embodiment of the present invention this combination is implicitly carried out to the extent required, without performing any of the additional operations. More specifically, if the contents of registers 100, 101, 110, 111 be interpreted as complex numbers instead of two real numbers, as would more naturally follow from the operations of iteration 1, then the desired nonredundant complex results of iteration 2 are at once at hand. This result follows partly from the initial reordering procedure, partly from the observed redundancy, and partly from the reinterpretation of the contents of the above-mentioned registers.

The degenerate real-value operations performed at the second iteration on the first half of the results of iteration 1 are, of course, performed in basically the same manner as in iteration 1. The pairings for these real-value operations are determined by choosing samples having binary identity numbers with 0 as a leading (leftmost) digit and differing in the second digit only. Again, the actual memory location of these samples is easily determined by using the reordering algorithm.

The operands used in iteration 2 are shown at line 6 in FIG. 4 and the results of iteration 2 are shown at line 7. From this, it is clear that memory locations 000 through 011 (0—3) continue to store only real numbers. These real numbers continue to require an L or R designation to completely locate them. Locations 100 through 111 (4—7) now are considered to contain complex numbers, with the left portion containing the real part and the right portion containing the imaginary part.

Because the identity numbers associated with the real value signals (results) may prove inconvenient for referring to complex results, the memory locations containing a complex signal will be used for this purpose. The binary form will be used, with the digits contained in parentheses, e.g., (100).

The third iteration introduces yet another division of the operands, only the first four (0—3) of the real results of the second iteration surviving as real value signals. These four real results of iteration 3 are formed from operands as indicated in the leftmost columns of lines 8 and 9.

As before, certain of the results of iteration 3 are formed by reinterpretation of previous results. More specifically, memory locations 010 and 011 are considered to contain complex signals, the left portion being considered to contain the real part and the right portion to contain the imaginary part.

The remaining (complex) calculations are performed as in the Cooley-Tukey version, yielding four new complex results stored at memory locations 100 to 111. These are 0 first nondegenerate calculations performed, and involve 45° phasors as indicated at lines 8 and 000L.

At the fourth and final iteration, the only real results are those of the previous iteration which are not transformed into complex results associated with identity numbers 0 and 1. These are used to form sum and differences, and the results are stored at 000L and 000R respectively. These latter results are therefore the only real results of the complete FFT, and represent coefficients of the DC and eighth harmonic ($X(\mathbf{0})$, $X(\mathbf{8})$), respectively. The results of the fourth iteration are shown at line 10 in FIG. 4 and the corresponding harmonic is shown at line 11.

The contents of memory location 001 (the results of iteration 3 having identity numbers 2 and 3), are reinterpreted at the fourth iteration as before to give rise to a complex result. This complex result is seen to correspond to the fourth harmonic frequency. The remainder of the computations in iteration 4 are standard complex calculations as is indicated at line 10.

The final nonredundant results of the FFT as computed in accordance with one algorithmic version of the present invention may be read from lines 1, 2 and 11 of FIG. 4. Line 1 identifies the memory location and line 2 the left or right portion of each location. This left-right division is needed only for identifying the two real-valued results $X(\mathbf{0})$ and $X(\mathbf{8})$; in all other cases a complex result is associated with an entire memory location. Line 11 identifies the particular coefficient computed.

When the complete (redundant) set of harmonic coefficients, or a particular coefficient not explicitly computed, is desired, appropriate conjugations are easily performed. This process will be illustrated for the case of a single, nonexplicitly-calculated coefficient, say, the third harmonic coefficient, $X(3)$.

Using a four-digit binary number, 3 appears as 0011. When these digits are reversed, 1100 is the result. The digit following the first 1 is then examined. If it is a 0, the remaining digits (other than the one examined) identify the location of the desired coefficient, i.e., it is identified as one which has been calculated explicitly. The desired result may then be read from the memory location associated with the three-digit signal.

In the case when $X(3)$ is desired, 1100 is found to contain a 1 immediately after the first 1. This is interpreted to mean that $X(3)$ has not been explicitly calculated. That is, only the conjugate of the desired coefficient has been calculated. The problem then remains to locate this conjugate signal and conjugate it. This desired location is determined by deleting the digit following the first 1 (necessarily a 1 itself, here), and complementing the following digits. Thus 1100 becomes 100 and thence 111. The conjugate of the desired result may be found at location 111. Upon reading out the signal stored at 111 and conjugating it, we generate the desired coefficient $X(3)$.

The above-described method of performing the real-valued-input FFT in accordance with the present invention is illustrated in FIG. 5 in flow chart form. The block identified by the numeral 400 corresponds to the above-mentioned real value calculations; the blocks identified by 100 correspond to the standard complex calculations. The operations shown in FIG. 5 may be summarized as follows:

1. Real-valued input signals are selectively placed in memory in accordance with the reordering algorithm given above. The location is specified at line 1 for respective samples shown at line 2.
2. Real-value calculations are exhaustively performed for successive iterations on pairs of operands, of which the first one of each iteration is shown in FIG. 5 in a manner similar to that used in FIG. 3. All real value calculations are performed first; final results $X(\mathbf{0})$ and $X(\mathbf{8})$ are generated before any complex numbers are introduced.
3. Complex results of iterations are obtained by reinterpretation of real-valued results of the previous iteration which are not used to form new real-valued results. These reinterpretations are also conveniently performed before performing any complex calculations.
4. The remaining complex results of each iteration are formed by performing complex calculations, the first of each iteration again being shown in FIG. 5.
5. The final results are stored in memory as complex-valued signals in locations indicated on the bottom line in FIG. 5.

In FIG. 5 all binary integers refer to memory locations, with L and R indicating left and right, respectively. All decimal numbers refer to iteration-result-identification signals, the input signals being considered the results of the zeroth iteration. Block 400 represents the above-mentioned real value calculation steps. The notation RC–3, for example, indicates a real value calculation associated with the third iteration.

Block 500, labeled N0–OP, indicate the no-operation step of reinterpreting two real-valued signals as a single complex number. The blocks labeled "CC" and having identification numerals 100represent the previously-described complex calculation steps. By analogy with the real-value calculation blocks, the number following "CC" indicates the iteration number, e.g., CC–3 indicates a third iteration complex calculation.

The steps involved in computing the FFT are conveniently performed in the order given above. In terms of the FIG. 5 notation, all RC operations are performed first, followed by all N0–OP's, which in turn are followed by all CC operations. In all cases lower numbered iterations precede higher numbered ones. The results shown at the bottom of FIG. 5 are the complete set of nonredundant Fourier coefficients. Conjugation operations are performed for generating those coefficient signals not explicitly shown in FIG. 5. The algorithm given above in the discussion of FIG. 4 may profitably be used for this purpose.

HARDWARE AND SOFTWARE IMPLEMENTATIONS

The present invention has been disclosed above in the form of an algorithm readily understandable to one skilled in the art. It should be recognized, however, that those wishing to practice the invention may wish to construct apparatus for performing one or more of the operations described above. Others will find it more convenient to practice the present invention on a general purpose computer, or other programmable machines having more specialized capabilities. In the latter case, it will only be necessary for users of the invention to code the operations above in accordance with the provisions and limitations of the particular programmable machine being used.

Figure 6:
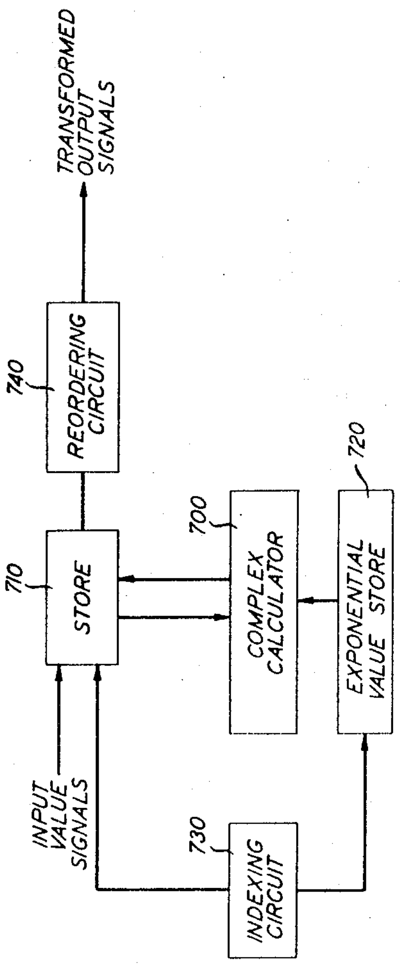
FIG. 6 is a block diagram of apparatus for generating Fourier transformed signals in accordance with one embodiment of the present invention.

FIG. 6 shows a block diagram of a hardware embodiment of the present invention. Shown there is a complex calculator 700 for performing the operations shown for example, in FIG. 5 as blocks 100 and 400.

This may conveniently take the form of that described in the Shively reference, supra, or others of that broad class. Also shown in FIG. 6 is a store 710 for storing the intermediate results generated at each iteration, and of course, the original input sequence. These signals may be presented and stored in any convenient form including electrical or magnetic polarity indications. Exponential value store 720 is used to store signals representing the exponential values needed in the complex calculations. Indexing circuit 730 performs the selection of operands from store 710 and exponential values from store 720 as prescribed by the above-described algorithm. Reordering circuit 740 is useful for reordering the sequence of final results so that the final signals output may be presented in order of increasing frequency.

The above-described embodiments of the present invention are merely typical and in no way limit the scope of the principles and application of the present invention. Numerous and varied modifications and applications within the spirit of the present invention will occur to those skilled in the art.

In particular, the examples discusses were limited for reasons of clarity to cases of $N$=32 or less. The principles of the present invention are, however, easily applied to cases where the number of input samples is arbitrarily large.

What I claim is:

1. In a machine having a memory, the method of generating signals representing a complete set of Fourier series coefficients corresponding to a sequence of real-valued input signals comprising the following automatically performed steps of 1. performing successive iterations of a Cooley-Tukey transform based on said input signals, including at each iteration only the first of each pair of intermediate sets of operations which would otherwise yield complex conjugate signals as results, and
2. generating signals representing complex conjugates of the complex results of the final iteration of said transform.

2. The method of claim 1 wherein said step of performing successive iterations comprises the step of operating on all exponential operands having a given argument before proceeding to such operands having a different argument.

3. The method of claim 1 wherein said step of performing successive iterations comprises the step of operating on all real-valued operands before proceeding to operands having complex values.

4. The method of claim 1 wherein said step of generating signals representing complex conjugate signals comprises the steps of 1. generating a signal representing the harmonic number of a desired coefficient which has not been explicitly generated,
2. generating a reversed signal representing in digits-reversed order said signal representing said harmonic number,
3. generating a memory identification signal by deleting the digit following the first 1 and complementing the digits following said first 1 in said reversed signal, and
4. generating a signal representing the conjugate of the signal stored in a memory location uniquely corresponding to said memory identification signal.

5. In a method for the machine processing of real-valued data in accordance with iterative fast Fourier transform techniques on a machine having memory and computational facilities, the improvement comprising the step of selectively deleting from memory at intermediate iterations those results which represent complex conjugate values of a previously generated one of said intermediate results.

6. In a machine having a memory, the method of generating signals representing Fourier series coefficients corresponding to a sequence of real-valued input signals comprising the following automatically performed steps:

1. performing successive iterations of a fast Fourier transform based on said input signals, including at each iteration only the first of each pair of intermediate sets of operations which would otherwise yield complex conjugate signals as results, and
2. generating signals representing complex conjugates of at least some of the complex results of the last iteration of said transform.

7. The machine method of storing in a plurality of machine memory locations a sequence of signals having a unique correspondence to a sequence of binary integers comprising the steps of 1. identifying the most significant 1 in each one of said binary integers,
2. storing said signal corresponding to said one of said binary integers in a first memory location when no 1's are identified in digit positions other than the least significant digit position in said binary integer, and
3. storing said signal corresponding to said one of said binary integers in a memory location identified with a modified binary integer formed by masking the digit following the most significant in said binary integer.

8. The method of claim 7 comprising the additional step of storing said signal corresponding to said one of said binary integers in a portion of said memory location identified with said modified binary integer, which portion is identified with said masked binary digit.

9. The machine method of generating a sequence of signals representing Fourier series coefficients corresponding to a sequence of signals stored in a machine memory comprising the steps of 1. generating a sequence of reference binary signals, 2. generating first and second sequences of binary signals by appending to said reference binary signals signals representing a binary 1 and a binary 0 respectively,
3. accessing said stored signals in pairs from memory locations identified with said first and second sequences of binary signals, and
4. selectively combining said accessed signals with each other and with selected exponential signals.

UNITED STATES PATENT OFFICE
CERTIFICATE OF CORRECTION

Patent No. 3,584,781 Dated June 15, 1971

Inventor(s) James O. Edson

It is certified that error appears in the above-identified patent and that said Letters Patent are hereby corrected as shown below:

Title page, change inventor's name from "Janes O. Edson" to --James O. Edson--.

Column 3, line 22, change "$A_0$(kare" to --$A_0(k)$ are--; line 36, change "$A_p$(k where" to --$A_p(k)$ where--; line 40, change "$X(j_{m11}j_{m12},\ldots,j_1,j_0) = A_m(j_0,\ldots,j_{m11})$" to --$X(j_{m-1},j_{m-2},\ldots,j_1,j_0) = A_m(j_0,\ldots,j_{m-1})$--. Column 5, line 51, change "X(aj)" to --X(j)--; line 52, change "X(N/2aturn" to --X(0) and X(N/2) turn--; line 66, change "to" to --of--. Column 6, line 12, change "$2^{p12}$" to --$2^{p-2}$--. Column 7, line 69, change "$2^{m1111}$" to --$2^{m-1-1}$--; line 70, change "$2^{m11}$" to --$2^{m-1}$--. Column 11, line 67, change "discusses" to --discussed--.

Signed and sealed this 28th day of December 1971.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
U.S. GOVERNMENT PRINTING OFFICE : 1969 O-366-334